US007255260B2

(12) United States Patent
Franchet et al.

(10) Patent No.: US 7,255,260 B2
(45) Date of Patent: Aug. 14, 2007

(54) ASSEMBLY FOR THE MANUFACTURE OF A HOLLOW MECHANICAL PART BY DIFFUSION BONDING AND SUPERPLASTIC FORMING, USE OF SUCH AN ASSEMBLY AND PROCESS FOR MANUFACTURING SUCH A MECHANICAL PART

(75) Inventors: Jean-Michel Franchet, Paris (FR); Patrick Gesmier, Sannois (FR)

(73) Assignee: Snecma Moteurs, Paris (FR)

( * ) Notice: Subject to any disclaimer, the term of this patent is extended or adjusted under 35 U.S.C. 154(b) by 91 days.

(21) Appl. No.: 10/803,957

(22) Filed: Mar. 19, 2004

(65) Prior Publication Data

US 2004/0238601 A1    Dec. 2, 2004

(30) Foreign Application Priority Data

Mar. 21, 2003    (FR)    .................................. 03 03476

(51) Int. Cl.
*B23K 39/00*    (2006.01)
(52) U.S. Cl. .................. 228/173.1; 228/118; 228/193; 29/889.72
(58) Field of Classification Search ................ 228/193, 228/118, 173.1; 29/889.72, 889.7
See application file for complete search history.

(56) References Cited

U.S. PATENT DOCUMENTS

| 4,304,350 A | * | 12/1981 | Paez et al. ................... 228/118 |
| 4,787,821 A | * | 11/1988 | Cruse et al. ................ 416/185 |
| 4,869,422 A | * | 9/1989 | Turner ........................ 228/186 |
| 5,024,368 A | * | 6/1991 | Bottomley et al. .......... 228/118 |
| 5,069,383 A | * | 12/1991 | Cooper et al. ............... 228/157 |
| 5,273,202 A | | 12/1993 | Douglas ..................... 228/44.3 |
| 5,344,063 A | * | 9/1994 | Johnston et al. ............ 228/157 |
| 5,479,705 A | * | 1/1996 | Fowler et al. ............ 29/889.72 |
| 5,484,977 A | * | 1/1996 | Douglas ................. 219/121.13 |
| 5,711,068 A | * | 1/1998 | Salt ............................ 29/889.1 |
| 5,826,332 A | * | 10/1998 | Bichon et al. ........... 29/889.72 |
| 6,264,091 B1 | * | 7/2001 | Milburn ..................... 228/157 |
| 2001/0022023 A1 | * | 9/2001 | Wallis ..................... 29/889.72 |

FOREIGN PATENT DOCUMENTS

FR    2 754 478    4/1998

* cited by examiner

*Primary Examiner*—Jonathan Johnson
*Assistant Examiner*—Michael Aboagye
(74) *Attorney, Agent, or Firm*—Oblon, Spivak, McClelland, Maier & Neustadt, P.C.

(57) ABSTRACT

A method for manufacturing an assembly including a stack of at least two primary parts, the primary parts being joined together around their periphery with the exception of a place forming a passage so as to define between the two of them a cavity, and the primary parts having, facing the cavity, at least one face that is covered, in a pattern, with a stop-off product containing a binder that can be thermally degraded, and a sealed reservoir having an open end, the end being joined in a sealed manner to the passage in the stack so as to allow communication between the internal space of the reservoir and the cavity, the reservoir being placed under a partial vacuum, this being produced so as to be non-deformable at the temperature and at the pressure at which the diffusion bonding of the said stack takes place.

10 Claims, 1 Drawing Sheet

ASSEMBLY FOR THE MANUFACTURE OF A HOLLOW MECHANICAL PART BY DIFFUSION BONDING AND SUPERPLASTIC FORMING, USE OF SUCH AN ASSEMBLY AND PROCESS FOR MANUFACTURING SUCH A MECHANICAL PART

CROSS REFERENCE TO RELATED APPLICATIONS

This application is based upon and claims priority under 35 U.S.C. §119 from French Patent Application No. 0303476, filed Mar. 21, 2003.

FIELD OF THE INVENTION

The invention relates to an assembly allowing the manufacture of a hollow mechanical part by diffusion bonding and superplastic forming, to the use of such an assembly and to the process for manufacturing a hollow mechanical part by diffusion bonding and superplastic forming.

More precisely, the present invention relates to improving the conditions under which the diffusion bonding step is carried out and in particular the present invention aims to eliminate, before heating to the diffusion bonding temperature, any source of contamination of the surfaces to be assembled, especially residues resulting from the degradation of the stop-off product forming a diffusion barrier.

BACKGROUND OF THE INVENTION

It will be recalled that the diffusion bonding technique consists in bringing two surfaces of a given material into contact with each other at high temperature and under a certain pressure for a certain time. The two surfaces then bond together by atomic diffusion, this having the advantage of forming a bonded structure equivalent to the base structure of the material.

Of course, the quality of the bond depends on the operating parameters: temperature, pressure and time, but also parameters associated with the components to be joined together, generally in the form of plates: metallurgical structure and surface finish (cleanness, roughness). Consequently, it is paramount to eliminate any source of contamination of the surfaces to be joined together before they are heated to the temperature for the diffusion bonding step.

This surface cleaning operation is conventionally carried out by creating a vacuum in the cavity formed by the two surfaces to be bonded together. However, in the case of diffusion bonding associated with superplastic forming, a stop-off product is used to prevent diffusion bonding in those regions of the facing surfaces that will be subsequently be inflated in order to obtain a hollow mechanical part.

This type of product is composed of a binder, generally an organic binder, and a powder of a diffusion barrier material, such as a refractory material like a ceramic (for example yttrium oxide or alumina or boron nitride), or graphite.

After application of the stop-off product in a defined pattern corresponding to those areas of the surfaces that are not to be joined together by diffusion bonding, the binder is degraded so as to conserve only the powder of the stop-off product, which is formed from particles that exhibit anti-adhesion properties, preventing the atoms of the materials of the plates to be bonded from diffusing.

During this degradation of the binder by raising the temperature to generally between 200 and 400° C., residues, particularly gas residues, form, which may contaminate, to various degrees depending on their chemical composition, the surfaces to be bonded.

Thus, it will be understood that is essential also to remove the degradation residues of the stop-off product.

It should be noted that the mechanical strength of the stop-off product is greatly reduced after this degradation, so that it is necessary to avoid manipulating and/or moving the parts to be bonded or to create disturbances within the cavity that could cause the particles of the stop-off powder to be disseminated in those regions of the surfaces to be bonded that have to be joined by diffusion bonding.

Conventionally, these degradation residues are reduced by creating a partial vacuum in the cavity formed by the two surfaces to be bonded.

It has also been proposed to circulate an inert gas, such as argon, in this cavity and then to create a partial vacuum in this cavity for the actual diffusion bonding step (FR 2 754 478).

This solution is relatively difficult to implement since it is necessary to install a system of pipes and fittings for circulation of the inert gas and for the subsequent vacuum created, this system also constituting a source of possible leaks and making the diffusion bonding operation more complex to implement. Furthermore, this solution allows only a single part to be treated at a time and the creation of a vacuum lengthens the manufacturing time.

In addition, it should be noted that when the binders volatilize the mechanical behaviour of the stop-off product greatly deteriorates in such a way that the flow of inert gas circulating in the cavity may result in local dissemination of the stop-off particles on the surfaces to be bonded.

Finally, it should be noted that despite the creation of a partial vacuum in the cavity at the end of degradation, the risk of retaining inert gas, trapped in certain regions of the cavity, is not zero, it being possible for such residual gas pockets to locally prevent diffusion bonding.

Moreover, U.S. Pat. No. 5,484,977 and U.S. Pat. No. 5,273,202 have proposed the elimination of the residues from the degradation of the binder for the stop-off products by the fact that the assembly is placed in a chamber under a dynamic partial vacuum, that is to say with continuous suction in order to extract the gases coming from the degradation of the binder.

Here again, it is difficult to treat several parts at the same time because of the volumes to be put under a partial vacuum, the treatment time is long, and it is necessary to install a large vacuum chamber. This makes the process expensive to implement.

SUMMARY OF THE INVENTION

It is an objective of the present invention to provide an assembly for manufacturing a hollow mechanical part by diffusion bonding and superplastic forming that does not have the drawbacks of the prior art, but satisfactorily extracts the gaseous residues arising from the degradation of the stop-off products, before the diffusion bonding step.

For this purpose, the present invention proposes an assembly allowing the manufacture of a hollow mechanical part by diffusion bonding and superplastic forming, comprising:

a stack of at least two primary parts, the said primary parts being joined together around their periphery with the exception of a place forming a passage so as to define between the two of them a cavity, and the said primary parts having, facing the said cavity, at least one face that is covered, in a pattern, with a stop-off product containing a binder that can be thermally degraded; and a sealed reservoir having an internal space and an open end, the said end being joined in a sealed manner to the said passage in the said stack so as to allow communication between the said internal space of the said reservoir and the said cavity, the reservoir being placed under a partial vacuum, this being produced so as to be non-deformable at the temperature and at the pressure at which the diffusion bonding of the said stack takes place and having a volume such that, when the said assembly is at the thermal degradation temperature of the said binder, the gases resulting from the degradation of the binder are sucked up into the reservoir.

Thus, it will be understood that, because of the presence of the reservoir, having a suitable volume for sucking out the gaseous residues, which reservoir is made from a material able to withstand, without deforming, high temperatures and high pressures, the gaseous resides coming from the degradation of the binder of the stop-off product are extracted immediately upon raising the temperature, this possibly corresponding to the step that precedes the diffusion bonding operation.

It will also be understood that such an arrangement is really easy to implement owing to the fact that there is no external vacuum chamber, nor any gas to be pumped or circulated once the join between the stack and the reservoir has been made.

This solution also has the additional advantage of making it possible to carry out simultaneously, in series, the diffusion bonding step on several stacks/assemblies for which the gaseous residues have been extracted, without having to disconnect or modify each stack/assembly.

Overall, thanks to the arrangement according to the present invention, it is possible to very simply carry out, simultaneously with the degradation step performed by raising the stack to a temperature allowing degradation of the binder, namely in general between 200 and 400° C., the extraction of the gaseous residues.

According to a preferred arrangement, the said stack is characterized in that the said mechanical part is a hollow turbomachine blade, in particular a fan rotor blade, and in that the said stack comprises three primary parts composed of a suction side primary part, a central plate and a pressure side primary part.

This is because the present invention is most particularly suitable to the production of a mechanical part obtained from three primary parts, so as to form a hollow turbomachine blade, the suction side primary part and the pressure side primary part constituting, in the case of the final part, the upper part (or suction skin) and the lower part (or pressure skin) of the blade respectively, and the central plate constituting, in the final part, a reinforcing spacer. This reinforcing spacer is placed between the upper part and the lower part of the blade, the said spacer being bonded to these two parts at the points on the facing surfaces of the three primary parts that are not covered with stop-off product.

Preferably, the said reservoir is made from a nickel-based or cobalt-based metal alloy.

According to another preferred arrangement, the said volume of the reservoir is between 10 and 100 times the volume of the said cavity in the stack.

Preferably, the said reservoir is placed under a partial vacuum of between 0.01 and 0.1 Pa, preferably between 0.03 and 0.07 Pa, and more preferably substantially equal to 0.05 Pa (i.e. between $1\times10^{-4}$ mbar and $10\times10^{-4}$ mbar, preferably between 3 and $7\times10^{-4}$ mbar and more preferably approximately equal to $5\times10^{-4}$ mbar).

Such a design together with these pressure levels ensures that the gaseous residues are completely sucked out during the binder degradation step carried out at high temperature.

The present invention also relates to the use of such an assembly for extracting the gaseous residues present in a cavity that separates at least two primary parts intended to be joined together by diffusion bonding for the purpose of obtaining, after superplastic forming, a hollow mechanical part.

The present invention also relates to the process for manufacturing a hollow mechanical part by diffusion bonding and superplastic forming, comprising the following steps:

a) at least two primary parts are provided;

b) a stop-off product is deposited in a predefined pattern on at least one face among each pair of those faces of the said primary parts that are intended to face each other;

c) a sealed reservoir having an open end is provided, the said reservoir being produced so as to be non-deformable at the temperature and pressure at which the material of the said primary parts undergoes diffusion bonding;

d) the primary parts are joined together around their periphery with the exception of a place forming a passage, the said primary parts forming a stack and defining, pairwise between them, a cavity that communicates with the said passage;

e) the stack and the reservoir are placed in a chamber under a partial vacuum of the chamber, thereby the internal volume of the reservoir is placed under a partial vacuum;

f) a sealed join is made between the said open end of the reservoir and the said passage of the said stack in the said chamber under partial vacuum, so as to form an assembly allowing communication between the said internal space of the said reservoir and the said cavity;

g) the chamber is heated to the thermal degradation temperature of the said binder, preferably between 200 and 400° C., thereby allowing the gases resulting from the degradation of the binder to be sucked into the reservoir;

h) the chamber is heated to the diffusion bonding temperature and pressurized to the diffusion bonding pressure, which causes the stack to undergo hot isostatic pressing diffusion bonding;

i) the reservoir is separated from the bonded stack;

j) the said bonded stack is placed in a mould; and k) the said mould is brought to the superplastic forming temperature and an inert gas is injected under the superplastic forming pressure via the said passage in the said cavity, whereby the stack undergoes inflation and superplastic forming, allowing a blank of the mechanical part to be obtained.

According to preferred method of implementation, the said step d) for joining the primary parts and the said step f) for making the sealed join are carried out by electron beam welding.

According to another preferred arrangement, the said partial vacuum is between 0.01 and 0.1 Pa, preferably between 0.03 and 0.07 Pa, and more preferably approximately equal to 0.05 Pa (i.e. between $1\times10^{-4}$ mbar and $10\times10^{-4}$ mbar, preferably between 3 and $7\times10^{-4}$ mbar and more preferably approximately equal to $5\times10^{-4}$ mbar).

According to a preferred application of the process forming the subject matter of the present invention, the said mechanical part is a hollow turbomachine blade, in particular a fan rotor blade, and the said stack comprises three primary parts that are made up of a suction side primary part, a central plate and a pressure side primary part.

BRIEF DESCRIPTION OF THE DRAWINGS

Other advantages and features of the invention will become apparent from reading the following description given by way of example and with reference to the appended drawings in which:

DETAILED DESCRIPTION OF THE INVENTION

Figure 1:
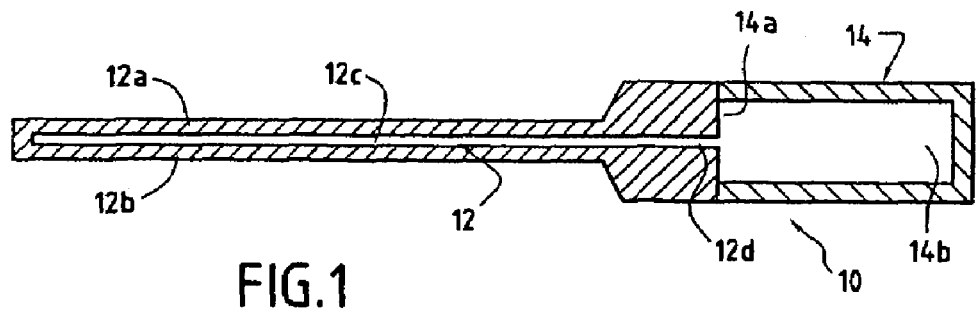
Figure 2:
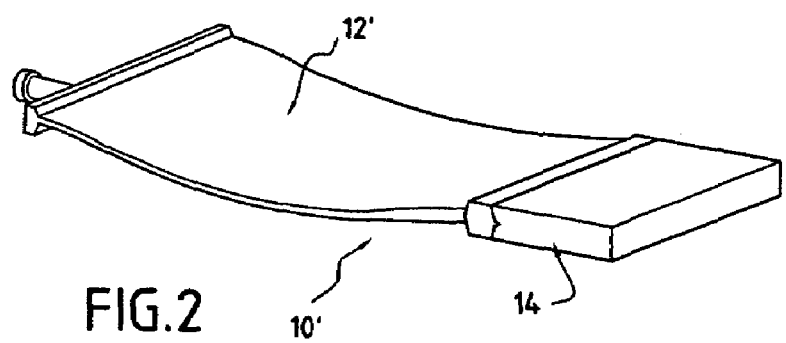
Figure 3:
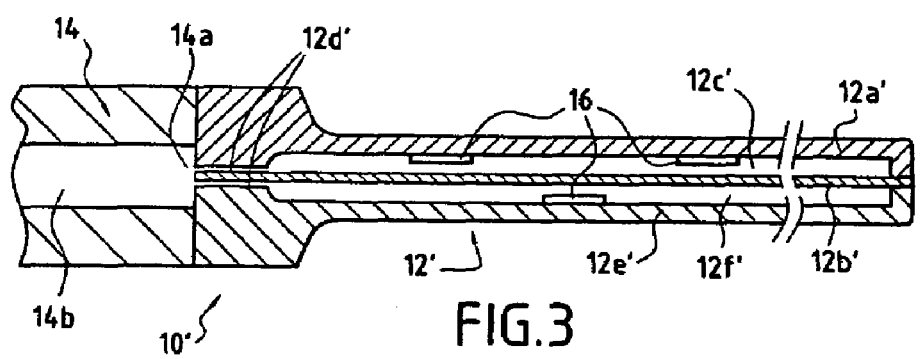

FIG. 1 shows, schematically and in longitudinal section, an assembly according to the present invention;

FIG. 2 shows, in perspective, an assembly according to the present invention in its application to a turbomachine blade; and FIG. 3 shows partly and on an enlarged scale, the longitudinal section of the assembly of FIG. 2.

FIG. 1 shows an assembly 10 according to the present invention, which constitutes, on the left, a stack 12 and, on the right, a reservoir 14.

The reservoir 14 is sealed and has an open end 14a, defining an internal space 14b of predetermined volume.

It will be understood that this reservoir 14 must withstand pressures at temperatures corresponding to those involved in the diffusion bonding step, that is to say up to a temperature of around 900 to 1000° C. and a pressure of around $4\times10^6$ Pa, that is to say 40 bar.

For this purpose, the reservoir 14 is chosen to be made from a suitable material, preferably a nickel-based metal alloy (for example IN100 or NK15CAT) or a that is to say a high-strength alloy.

This reservoir 14 may have the overall shape of a rectangular parallelepiped or any other shape, and it may also be equipped (this situation not being illustrated) with internal stiffeners allowing better resistance to the pressure to which it will be subjected during the diffusion bonding step.

The stack 12 in FIG. 1 represents a first embodiment in which it consists of a first primary part 12a and a second primary part 12b, between which a cavity 12c is defined.

This stack 12 is obtained after the primary parts 12a and 12b, which essentially have the shape of a plate, have been joined together along their periphery so as to define the cavity 12c between them.

More precisely, during this joining step, the periphery of the primary parts 12a and 12b is not closed at a place intended to form a passage 12d between the outside and the cavity 12c.

As may be seen in FIG. 1, the primary parts 12a and 12b are shaped, in their portion corresponding to the passage 12d, so that sealed mounting can be effected between the reservoir 14, at its open end 14a, and the stack 12, at the passage 12d.

The primary parts 12a and 12b are made from materials that can be formed superplastically, for example titanium or a titanium-based alloy, or else from a metal-based composite comprising titanium.

The aforementioned primary parts 12a and 12b may be joined together and the reservoir 14 joined to the stack 12 by various types of welding. Preferably, these two joins are produced by laser welding or by electron beam welding.

These two welding steps may be carried out in succession in the same chamber under a partial vacuum, so as to allow, after formation of the assembly 10, the internal space 14b coming from the reservoir 14 to be under a partial vacuum. This partial vacuum is preferably between 0.01 and 0.1 Pa, preferably between 0.03 and 0.07 Pa, and more preferably 0.05 Pa (i.e. between $1\times10^{-4}$ mbar and $10\times10^{-4}$ mbar, preferably between 3 and $7\times10^{-4}$ mbar and more preferably $5\times10^{-4}$ mbar).

To allow the gaseous residues to be sucked out, the volume of the internal space 14b of the reservoir 14 is between 10 and 100 times, preferably between 50 and 100 times, the volume of the said cavity 12c in the stack 12.

It will therefore be understood that the assembly 10 has an internal structure in which the cavity 12c has a much smaller volume than the volume of the internal space 14b.

It is because of such a difference in volume that it is possible to suck out the residual gas coming from the degradation of the stop-off product; this is because, when the assembly 10 is heated to a thermal degradation temperature between 200 and 400° C., the stop-off product decomposes by degradation of the binder, which generates a gaseous residue that increases the pressure in the cavity 12c, this pressure increase being compensated for, within the internal space 14b initially placed under a partial vacuum, by suction of the residual gases thus formed owing to the equilibrium between the pressures in the internal space 14b and in the cavity 12c.

Since these steps—namely thermal degradation of the binder and suction of the residual gases into the reservoir 14—take place very rapidly, it is possible to carry out, very soon after and almost simultaneously, the diffusion bonding step.

This is because, after mounting the assembly 10 as indicated above, the latter is placed in a heating chamber that will be subjected to a temperature rise, the thermal degradation taking place when the temperature reaches at least 200° C.

This temperature rise is continued up to 900° C., and then an isostatic pressure of $4\times10^6$ Pa, i.e. 40 bar, is then exerted for approximately 3 hours in order to carry out the diffusion bonding between the primary parts 12a and 12b.

In a manner known per se, the facing faces of the primary parts 12a and 12b are covered, prior to the step of joining the stack 12 together, with a stop-off product (more precisely, one of these two facing faces or both facing faces are covered with the stop-off product). This coating is produced in a predefined pattern, for example by the known technique of screen printing.

Thus, there is no bonding between the facing surfaces of the primary parts 12a and 12b in the predefined pattern that corresponds to the places that must not be bonded together, in order to allow inflation during the subsequent superplastic forming operation.

It will therefore be understood that the extraction of the gaseous residues from the thermal degradation of the stop-off product is carried out almost simultaneously with the diffusion bonding step. In any case, it is unnecessary to carry out these two steps in different environments, so as not to incur any risk of the stop-off particles contaminating those surfaces of the primary parts 12a and 12b that have to be bonded together during the diffusion bonding step.

In addition, it should be noted that, since the diffusion bonding step does not damage the reservoir, the latter then being removed before the superplastic forming step, the said reservoir may be used again later in another assembly, together with another stack, in order to form another hollow mechanical part.

Reference will now be made to FIGS. 2 and 3, which show a second embodiment of an assembly according to the invention corresponding to the case of the production of a hollow blade.

Particularly in the case of the fan rotor blades of bypass turbojets, large-chord blades are used.

Such blades must meet harsh operating conditions and in particular have sufficiently high mechanical properties combined with anti-vibration properties and resistance to impact by foreign bodies.

The objective of achieving sufficiently high blade tip velocities has furthermore led to research on ways to reduce the masses, this objective being achieved in particular by the use of hollow blades.

FIG. 2 shows an assembly 10' according to this second embodiment, which comprises, on the right, the reservoir 14 and, on the left, the stack 12' that is intended to form, after diffusion bonding and superplastic forming, a hollow blade.

As may be seen in greater detail in the partial section shown in FIG. 3, the reservoir 14 (on the left) is similar to that in FIG. 1.

In contrast, in the second embodiment, the stack 12' (on the right in FIG. 3) differs from stack 12 of the first embodiment illustrated in FIG. 1 in that it comprises three primary parts 12a', 12b' and 12e'.

More precisely, the first primary part 12a' and the third primary part 12e' constitute a suction side primary part and a pressure side primary part respectively, both these being joined to the reservoir 14 in an enlarged region intended to form the blade root.

The second primary part 12b', which is inserted between the first primary part 12a and the third primary part 12e', constitutes a central plate, of smaller thickness, which will subsequently form the spacer serving as blade stiffener after the superplastic deformation.

This stack 12' defines a two-part cavity comprising a first cavity 12c', between the first primary part 12a' and the second primary part 12b', and a second cavity 12f', between the second primary part 12b' and the third primary part 12e'.

In order for the cavity formed by the first and second cavities 12c' and 12f' to be sealed, while still communicating with the internal space 14b of the reservoir 14, as may be seen in FIG. 3, the following arrangement is provided.

The first primary part 12a', the second primary part 12b' and the third primary part 12d' are joined together in a sealed manner along their periphery (see in particular on the right in FIG. 3) except at a place corresponding to the passage 12d' at the inlet of the first and second cavities 12c' and 12f'.

This FIG. 3 also shows, at various locations corresponding to the predefined pattern, the stop-off product 16 which in this case is placed on the internal face of the first primary part 12a' and the internal face of the third primary part 12e'.

The way in which the assembly 10' is assembled and its use for extracting the gaseous residues by thermal degradation of the gaseous residues present in the stack 10' are very similar to those explained above in relation to the first embodiment of the assembly 10.

The invention claimed is:

1. A process for manufacturing a hollow mechanical part by diffusion bonding and superplastic forming, comprising:
   a) providing at least two primary parts, said two primary parts having two faces and a periphery;
   b) depositing a stop-off product in a predefined pattern on at least one face among each pair of those faces of the primary parts that are intended to face each other;
   c) providing a reservoir having only one open end, the reservoir being produced so as to be non-deformable at the temperature and pressure at which the material of the primary parts undergoes diffusion bonding;
   d) joining said primary parts together around their periphery with the exception of a place forming a passage, the primary parts forming a stack and defining, pairwise between them, a cavity that communicates with the passage;
   e) placing the stack and the reservoir in a chamber under a partial vacuum of the chamber, thereby the internal volume of said reservoir is placed under a partial vacuum;
   f) making a sealed join between the open end of said reservoir and the passage of the stack in the chamber under partial vacuum, so as to form an assembly allowing communication between the internal space of the reservoir and the cavity;
   g) heating said chamber to the thermal degradation temperature of the binder, thereby allowing the gases resulting from the degradation of the binder to be sucked into the reservoir;
   h) heating said chamber to the diffusion bonding temperature and pressurized to the diffusion bonding pressure, which causes said stack to undergo hot isostatic pressing diffusion bonding;
   i) separating said reservoir from the bonded stack;
   j) placing the bonded stack in a mould; and
   k) bringing the mould to the superplastic forming temperature and an inert gas is injected under the superplastic forming pressure via the passage in the cavity, whereby the stack undergoes inflation and superplastic forming, allowing a blank of the mechanical part to be obtained.

2. The manufacturing process according to claim 1, wherein said joining the primary parts and the making the sealed join are carried out by electron beam welding.

3. The manufacturing process according to claim 1, wherein said partial vacuum is between 0.01 and 0.1 Pa.

4. The manufacturing process according to claim 1, wherein said mechanical part is a hollow turbomachine blade, in particular a fan rotor blade, and wherein the stack comprises three primary parts that are made up of a suction side primary part, a central plate and a pressure side primary part.

5. The manufacturing process according to claim 1, wherein the providing a reservoir includes providing a reservoir configured to withstand a temperature of at least 900° C. and a pressure of at least $4 \times 10^6$ Pa.

6. The manufacturing process according to claim 1, wherein the providing a reservoir includes providing a reservoir made from a nickel-based or cobalt-based metal alloy.

7. The manufacturing process according to claim 1, wherein the providing a reservoir includes providing a reservoir with a volume between 10 and 100 times a volume of the cavity in the stack.

8. The manufacturing process according to claim 1, wherein the heating said chamber to the diffusion bonding temperature includes heating said chamber to the diffusion bonding temperature between 200° C. and 400° C.

9. The manufacturing process according to claim 3, wherein the placing the stack and the reservoir in a chamber under a partial vacuum of the chamber includes placing the stack and the reservoir in a chamber under a partial vacuum of 0.03 to 0.07 Pa.

10. The manufacturing process according to claim 9, wherein the placing the stack and the reservoir in a chamber under a partial vacuum of the chamber includes placing the stack and the reservoir in a chamber under a partial vacuum of 0.05 Pa.

* * * * *